Feb. 8, 1949.                T. R. THOMPSON                2,461,485
        XANTHYLIUM DYE SALTS AS FILTER AND ANTIHALATION
                   DYES IN PHOTOGRAPHIC MATERIALS
                         Filed June 21, 1945
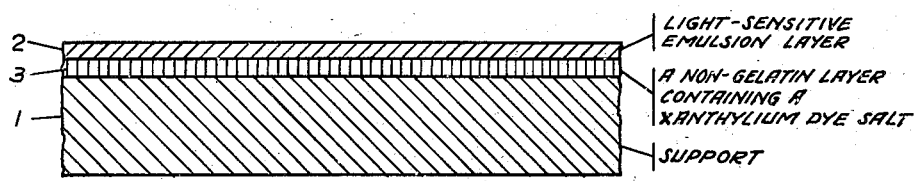
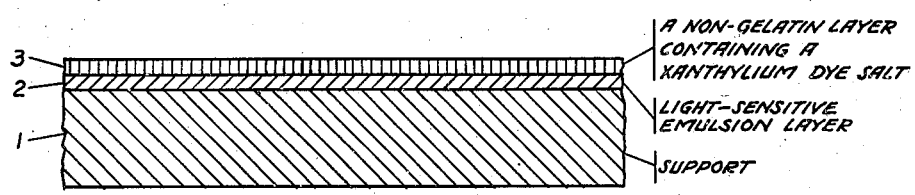
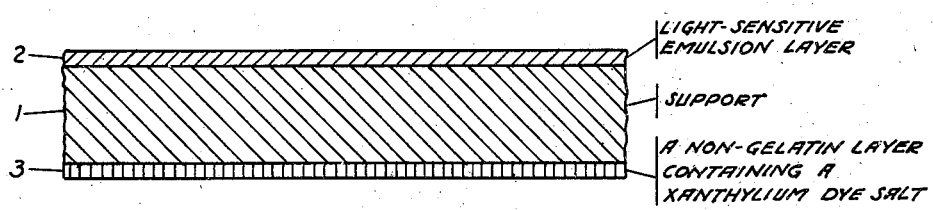
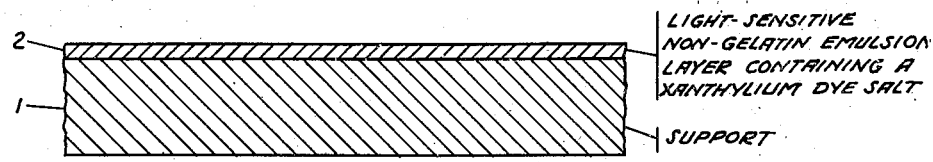
INVENTOR.
THOMAS R. THOMPSON
BY
ATTORNEYS.

UNITED STATES PATENT OFFICE 2,461,485

XANTHYLIUM DYE SALTS AS FILTER AND ANTIHALATION DYES IN PHOTOGRAPHIC MATERIALS

Thomas R. Thompson, Binghamton, N. Y., assignor to General Aniline & Film Corporation, New York, N. Y., a corporation of Delaware Application June 21, 1945, Serial No. 600,692

7 Claims. (Cl. 95—9)

This invention relates to filter and anti-halation dyes for photographic materials, and particularly to xanthylium dye salts as photographic filter and anti-halation dyes.

It is known in the art of making photographic materials such as multilayer color films, that color separation by the various layers is facilitated by the use of filters either incorporated directly into the emulsion layers or added as adjacent layers in the appropriate sequence. For example, blue light passing through the nonsensitized blue sensitive layer must be absorbed by a minus blue (i. e., yellow) filter before it reaches the green sensitive and red sensitive layers, which are likewise sensitive to blue light. Similarly, green absorbing filters are frequently desirable in order to obtain a better separation between the green and the red sensitive layers. Other filters with special characteristics are occasionally used, depending upon the absorption desired.

In a similar manner, colored light-absorbing layers are frequently used adjacent to a photographic support in order to prevent light scattering or halation effects caused by reflection of light rays from the support onto the sensitive layer. Such layers are commonly known as antihalation layers.

In order to perform their desired functions, filter and anti-halation dyes must be stable in a colloid carrier. They must be non-diffusing and readily removable in the customary processing baths. Moreover, it is essential that they have no injurious effects, such as fogging or desensitizing action, on the emulsion layers. Most dyes suggested in the past as suitable for filter layers fail to fulfill completely all of the above requirements.

The primary object of the present invention is to provide a class of xanthylium dye salts suitable as filter layers and anti-halation layers for photographic materials.

Another object is to provide photographic elements dyed with xanthylium dye salts, the color of which is readily dischargeable in the usual photographic processing baths.

A further object is to provide filter and anti-halation layers which have no deleterious effect on the photographic properties of the film.

Other objects and advantages of this invention will be apparent by reference to the following specification in which its preferred details and embodiments are described.

I have discovered that dyes having an xanthylium structure, and containing an inorganic or organic acid radical, are particularly adaptable as filter and anti-halation layers in photographic materials. The desired result can be achieved by the use of any xanthylium dye salt whether unsubstituted or substituted by a hydroxy, dialkylamino, alkoxy, etc. group. The xanthylium dye salts are very intense in color, and therefore may be used as photographic filter and anti-halation dyes in lesser amounts than the dyestuffs usually employed. Furthermore, they are completely and irreversibly decolorized in photographic processing baths, that is, the color of the dyes will not return in subsequent processing steps. The solubility of the xanthylium dye salts may be effectively controlled by varying the anion. This characteristic is of importance, inasmuch as the solubility of the dyes must be varied to fit the use thereof in particular media. For instance, if the dyes are to be used in hydroxyethyl cellulose or other water permeable media, water solubility of the dye is desired. For this purpose, the chloride salt, which for example is more soluble in water than the perchlorate, would recommend itself for use. On the other hand, for alkali-soluble resin coatings, alcohol solubility is desired, and this can be achieved by using an organic acid radical such as, for example, the acetate.

After the soluble dye is mixed with a suitable colloidal carrier, a small quantity of an inorganic salt solution such as $NaClO_4$, $KI$ or $NH_4SCN$, may be added. This serves to reduce the water solubility of the dyes and thereby ensure that the dyes will be more tenaciously retained by the colloidal carrier.

I have also found that the xanthylium dye salts have sharp "cut-offs" in their absorption curves. This characteristic makes them particularly useful in the prepartion of light filters in the form of non gelatin foils or other suitable film forming substances known to the art for use in photography or industrial applications where light of a definite quality is desired.

The xanthylium dye salts contemplated by the present invention are characterized by a structure corresponding to the following general formula:

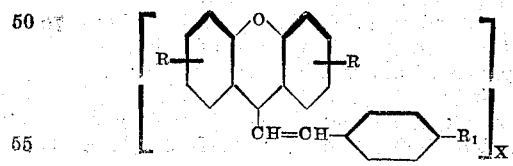

wherein R is either hydrogen or a hydroxy group, R₁ may be alkoxy, e. g., methoxy, ethoxy, propoxy, etc., alkylamino, e. g., methylamine, ethylamine, propylamine, butylamine, etc., dialkylamino, e. g., dimethylamino, diethylamino, dipropylamino and the like, and X represents an acid radical, e. g., Cl, Br, I, $SO_4$, $ClO_4$, $C_2H_3O_2$, $SO_3CH_2COOH$, $SO_3C_6H_4CH_3$, $FeCl_4$, and the like.

The method for the preparation of xanthylium dye salts is described by Atkinson and Heilbron in J. C. S., p. 682–684, 1926. The method consists of condensing an xanthylium salt, which contains a reactive methyl group in para position to the oxygen atom of the xanthylium ring, with an aromatic aldehyde in the presence of an acid.

Typical xanthylium salts containing a reactive methyl group which can be employed in the condensation with an aromatic aldehyde are 6-methyl-xanthylium chloride, 3,9-dihydroxy-6-methylxanthylium chloride, 3-hydroxy-6-methylxanthylium chloride and the like.

As typical illustrations of aromatic aldehydes usable for the preparation of xanthylium dye salts, may be mentioned, benzaldehyde, p-dimethylaminobenzaldehyde, p-hydroxybenzaldehyde, p-methoxybenzaldehyde, p-diethylaminobenzaldehyde, 2,4-dihydroxy-benzaldehyde, p-anisaldehyde, vanillin and the like. In place of aromatic aldehydes, the intermediates known in the art of cyanine dye manufaceure may be used, as for example, 2-(β-acetanilidovinyl) benzothiazole ethiodide, 2-formylmethine-1,3,3-indoline, ethyl orthoformate, β-ethoxyacrolein diethylacetal, and the like.

The xanthylium dye salts may be incorporated in a carrier medium such as organic esters of cellulose, e. g., hydroxyethyl cellulose, water soluble salts of dicarboxylic acid esters of cellulose described in U. S. Patent 1,884,035; polyesters, polyamides, synthetic resins such as vinyl acetal resins, polyvinyl acetalaldehyde acetal resins and partially hydrolyzed acetate resins described in U. S. Patents 1,939,422 and 2,036,092; polyvinyl alcohol; polyvinyl alcohol mixed with resorcinol; polyvinyl propionaldehyde; polymerization products such as polyacrylic acid, polystyreneacrylic acid, polyvinylchloridepolyacrylic acid, and polyacrylic acid nitrile-polystyrenecarboxylic acid described in U. S. Patent 2,077,789; alkali soluble resins in which the acid groups are in the form of anhydride groups as described in U. S. Patent 2,161,788, and the like.

Rather surprisingly, xanthylium dye salts are incompatible with gelatin, i. e., the color of the dyes is either degraded or partially destroyed. For this reason the use of gelatin as a carrying medium is excluded and consequently the carrying materials, which may be employed, will be hereinafter referred to as non-gelatin carrying media.

A surface active agent such as sulfated oleic acid, alkylated mono sodium benzenesulfonate, di-hexyl ester of sodium sulfosuccinate, sodium salt of an alkylnaphthalene sulfonic acid, sodium salt of tetrahydronaphthalene sulfonic acid, calcium glycerin phosphate, alkylphenylpolyethylene glycol, oleic acid ester of hydroxyethane sulfonic acid and sulfonated higher molecular weight primary or secondary aliphatic, aromatic and cyclo-aliphatic carboxy acids, may be added to the filter carrying medium to effect a smoother coating. It is to be noted, however, that any commercially available surface active agent may be employed. The nature of the surface active agent is immaterial so long as it possesses wetting, dispersing and emulsifying properties, and its aqueous solutions are colorless or only slightly tinted.

The following examples describe in detail the methods for accomplishing the above objects, but it is to be understood that they are inserted merely for the purpose of illustrations and are not to be construed as limiting the scope of the invention. The parts are by weight unless otherwise stated.

*Example I*

3,9-dihydroxy-6-p-methoxystyrylxanthylium chloride

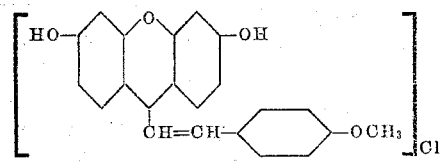

A mixture of 1 part of 3,9-dihydroxy-6-methylxanthylium chloride, 0.5 part of p-anisaldehyde, 3 parts by volume of acetic acid, and 2 parts by volume of acetic anhydride was heated at reflux for 15 minutes. After standing overnight, the dye was precipitated with ether. A methanol solution of the dye is red-orange.

A resin (mixed polymerizate from vinyl chloride and maleic acid anhydride) coating was made by adding 1 part by volume of a 1% methanol solution of the dye to 8 parts by volume of 5 to 8% solution of resin in alcohol and casting on a film base. The coating thus obtained is red-orange. The color is readily discharged when the coating is immersed in a common photographic developer and does not return in the presence of an acid short stop or hypo.

*Example II*

3,9-dihydroxy-6-p-diethylaminostyrylxanthylium chloride

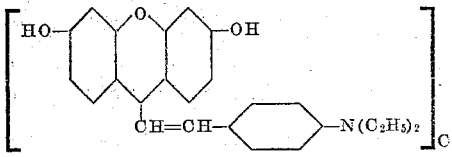

A mixture of 1.3 parts of 3,9-dihydroxy-6-methylxanthylium chloride, 0.9 part of p-diethylaminobenzaldehyde, 4 parts by volume of acetic acid and 4 parts by volume of acetic anhydride was heated at reflux for 10 minutes. The reaction mixture was cooled to room temperature and 50 parts by volume of ether added with stirring until a viscous semi-solid was obtained. The dye is sodluble in alcohol and can be incorporated in a resin to give a backing coating of dense blue color.

*Example III*

3,9-Dihydroxy-6-p-dimethylaminostyrylxanthylium chloride

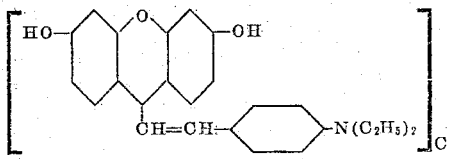

A mixture of 0.67 parts of 3,9-dihydroxy-6-methylxanthylium chloride, 0.4 parts of p-dimethylaminobenzaldehyde, 4 parts by volume of acetic acid, and 3 parts by volume of acetic anhydride was heated at reflux for 15 minutes. The reaction mixture was cooled to room temperature and the dye precipitated with ether. The dye salt is soluble in alcohol and can be incorporated in a resin to give a backing coating of blue color.

In preparing filter and anti-halation coatings from non-resinous carrying media, various surface active agents, plasticizers, etc. may be used as is the common practice in the photographic industry. It should be noted that the pH of the non-resinous coating composition need to be adjusted to suit the particular xanthylium dye salt used. In general, increased stability is obtained at a lower pH. Changes in pH may be advantageously employed to change the shade of color.

For the production of anti-halation coatings, the xanthylium dye salts of the present invention are incorporated into a water permeable non-gelatin carrying medium, and the dispersions thus obtained cast in a known manner as an intermediate layer between the support and the emulsion or as a backing layer on the rear surface of the emulsion support, or as a top coat on the emulsion when the material is intended to be exposed through the support.

The concentration of xanthylium dye salt used according to the present invention will vary somewhat depending upon the color desired. In general, the amount of xanthylium dye salt will vary from about 1 to 2 grams per kilogram of an 8–10% aqueous, alcohol, or acetone solution of non-gelatin carrier media in the preparation of anti-halation layers. In the preparation of light filters and colored film bases, the concentration will depend upon the intensity of the color desired, and can be readily determined by a few practical experiments.

In the accompanying drawing the various figures are enlarged section views of photographic elements having filter and anti-halation layers made according to my invention.

As shown in Figure 1, the support 1 is provided with an anti-halation layer 3, containing an xanthylium dye salt. The light-sensitive emulsion layer 2 is attached to the anti-halation layer 3.

Figure 2 illustrates a film in which the support 1 is coated with a light-sensitive emulsion layer 2, and on the latter side there is provided a filter layer 3 containing an xanthylium dye salt.

Figure 3 illustrates a film of which the support 1 bears on one side the light-sensitive emulsion layer 2, and on the other side an anti-halation layer 3 containing an xanthylium dye salt.

Figure 4 illustrates a film or plate of which the support 1 is provided with the light-sensitive non-gelatin emulsion layer 2 containing as a filter dye an xanthylium dye salt.

The filter and anti-halation coatings prepared as described above have been found to have particularly good filter and anti-halation properties and to have no effect on the normal keeping properties of the light-sensitive layers.

It will be understood that where in the claims appended hereto the term "filter layer" is used, that such is intended to include anti-halation layer.

While the present invention has been described in considerable detail with reference to certain preferred procedures, materials and uses, it is understood that the class of xanthylium dye salts and their use as filter and anti-halation dyes is not limited thereto and that numerous variations and modifications described in the foregoing specification may be made. As for example, a mixture of two or more xanthylium dye salts may be incorporated in a layer to obtain different shades or increased neutral density. It is also understood that non-gelatin colloidal media dyed with xanthylium dye salts may be coated on one or more of multilayer elements employed for color photography, which usually comprises a base coated with two or three light-sensitive emulsions, each of which records one of the desired spectral regions.

I claim:

1. A light sensitive photographic element comprising a base and a silver-halide emulsion carried thereby, said element having a non-gelatin water-permeable colloidal layer containing a dispersion of a xanthylium dye salt having the formula:

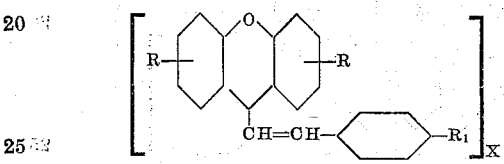

wherein R represents a member selected from the class consisting of hydrogen and hydroxy groups, $R_1$ is a member selected from the class consisting of alkoxy, alkylamino and dialkylamino groups, and X represents an acid radical.

2. A light sensitive photographic element comprising a base and a silver-halide emulsion carried thereby, said element having a non-gelatin water-permeable colloidal layer containing a dispersion of a xanthylium dye salt having the formula:

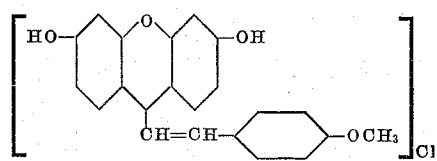

3. A light sensitive photographic element comprising a base and a silver-halide emulsion carried thereby, said element having a non-gelatin water-permeable colloidal layer containing a dispersion of a xanthylium dye salt having the formula:

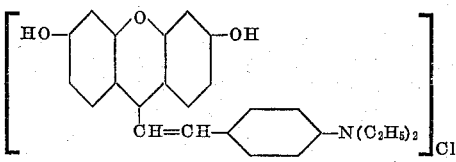

4. A light sensitive photographic element comprising a base and a silver-halide emulsion carried thereby, said element having a non-gelatin water-permeable colloidal layer containing a dispersion of a xanthylium dye salt having the formula:

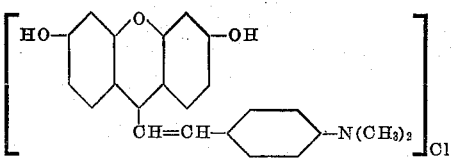

5. A light-sensitive photographic film having at least one silver-halide emulsion layer and at least one filter layer consisting of a non-gelatin, water-permeable colloidal carrier having dispersed therein, as the active filtering medium, a xanthylium salt of the general formula:

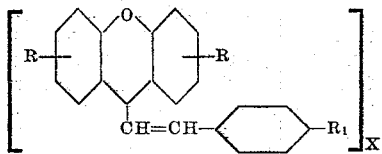

wherein R represents a member selected from the class consisting of hydrogen and hydroxy groups, $R_1$ is a member selected from the class consisting of alkoxy, alkylamino and dialkylamino groups, and X represents an acid radical.

6. A light-sensitive photographic film having at least one silver-halide emulsion layer and at least one filter layer consisting of a non-gelatin, water-permeable colloidal carrier having dispersed therein, as the active filtering medium, a xanthylium dye salt of the formula:

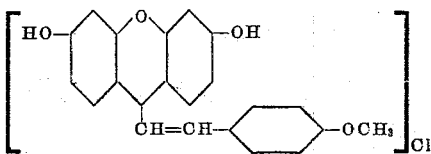

7. A light-sensitive photographic film having at least one silver-halide emulsion layer and at least one filter layer consisting of a non-gelatin, water-permeable colloidal carrier having dispersed therein, as the active filtering medium, a xanthylium dye salt of the formula:

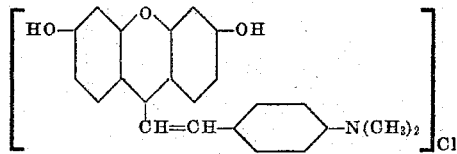

THOMAS R. THOMPSON.

REFERENCES CITED

The following references are of record in the file of this patent:

UNITED STATES PATENTS

| Number | Name | Date |
|---|---|---|
| 1,305,195 | Cocarnari | May 27, 1919 |
| 1,900,877 | Hickman | Mar. 7, 1933 |

OTHER REFERENCES

Journal of the Chemical Society (London) 1926, page 628–684.

Certificate of Correction

Patent No. 2,461,485. February 8, 1949.

THOMAS R. THOMPSON

It is hereby certified that errors appear in the printed specification of the above numbered patent requiring correction as follows:

Column 4, line 58, for "sodluble" read *soluble*; line 70, Example III, for that portion of the formula reading "$N(C_2H_5)_2$" read $N(CH_3)_2$;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*